Dec. 24, 1968          E. B. NOLT          3,418,015
TWINE CLAMPING MEANS AND CUTTER FOR BALER
Filed Aug. 16, 1967                      2 Sheets-Sheet 1
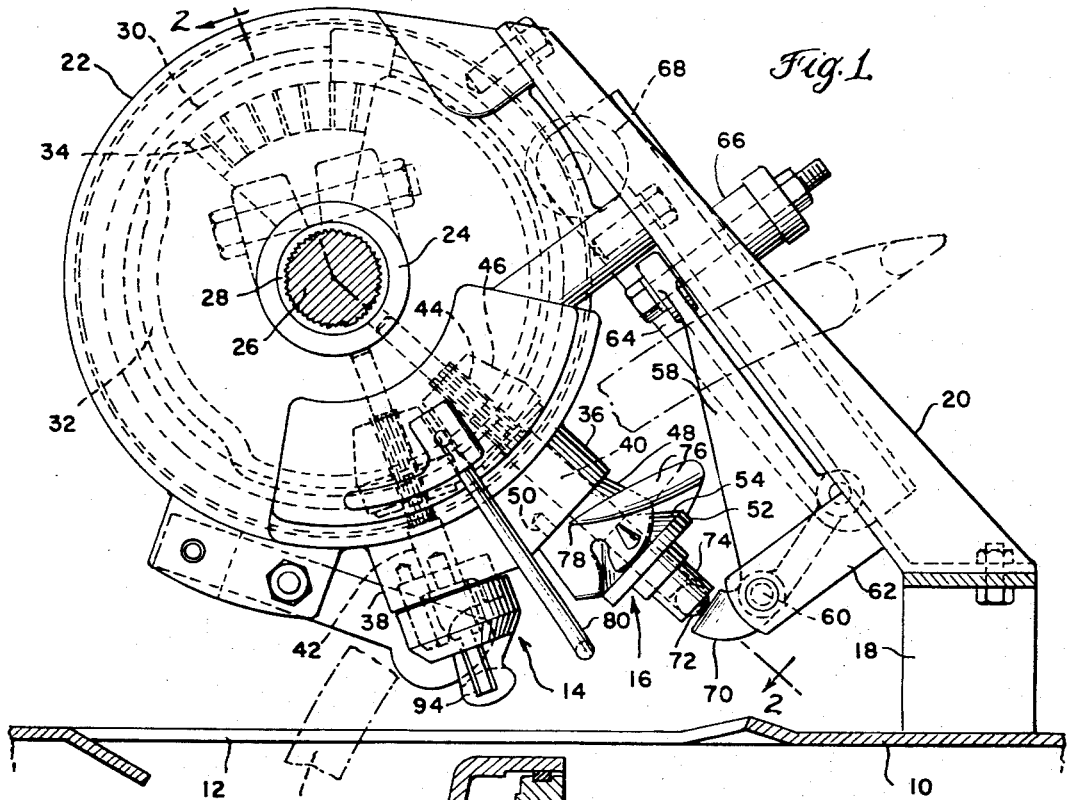
Fig. 1
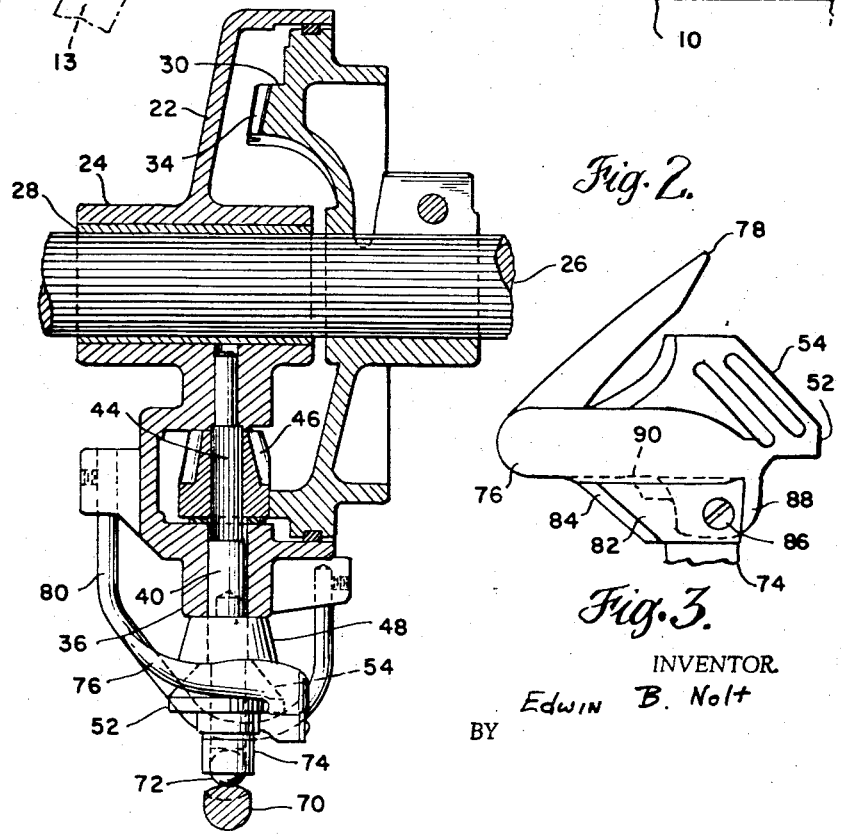
Fig. 2.
Fig. 3.
INVENTOR.
Edwin B. Nolt
BY Dec. 24, 1968  E. B. NOLT  3,418,015
TWINE CLAMPING MEANS AND CUTTER FOR BALER
Filed Aug. 15, 1967  2 Sheets-Sheet 2
Fig. 4.
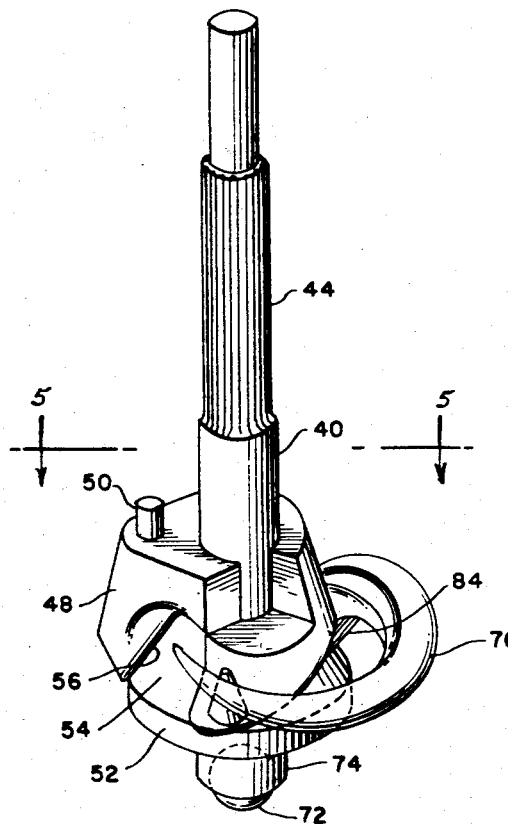
Fig. 5.
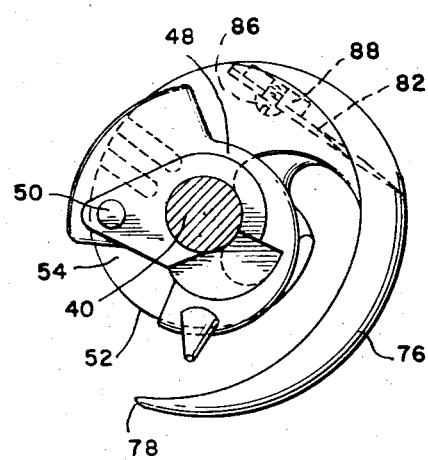
Fig. 6.
Fig. 7.
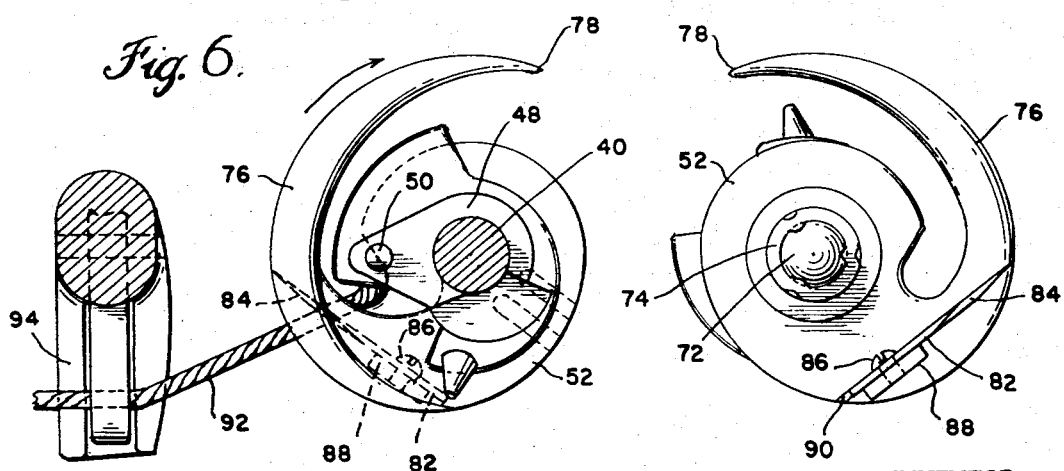
INVENTOR.
Edwin B. Nolt
BY United States Patent Office 3,418,015
Patented Dec. 24, 1968

3,418,015
TWINE CLAMPING MEANS AND CUTTER
FOR BALER
Edwin B. Nolt, New Holland, Pa., assignor to Sperry
Rand Corporation, New Holland, Pa., a corporation
of Delaware
Filed Aug. 16, 1967, Ser. No. 660,968
5 Claims. (Cl. 289—13)

ABSTRACT OF THE DISCLOSURE

Twine-tying mechanism for a baler having a clamping unit including complementary clamping members to clamp the leading end of a strand of twine therebetween and associated with an adjacent knotter unit, one of the clamping members being stationary and the other being rotatably supported by a shaft and provided with an arcuate twine guide hook which engages an elongated loop of twine of which one side strand comprises the end of a tied strand extending around a bale and the other side strand comprises the leading end of a new strand for another bale, said guide hook supporting a planar twine-cutting blade relatively close to the axis of said shaft and firmly secured against radial movement for cutting said tied strand from the leading end of the next strand accurately and with minimum torque requirement.

Cross-reference to related application

The present application is one of a series pertaining to a number of different elements and features of twine knotting and clamping mechanisms for use on a baler. The applications respectively, in general, cover individual elements, features or arrangements in the overall structure of the knotting and clamping mechanisms due in particular to various improvements in the details of said elements and arrangements having been made by various inventors and all of which inventions are commonly assigned to the assignee of the instant invention.

The first filed application in said series, applicant's copending application Ser. No. 633,496, filed Apr. 25, 1967, is entitled, Knotter Bill Hook.

Background of the invention

When a bale is being formed in the bale case of a baler with material, such as hay or straw, to be tied into a bale, the compressed material is gradually surrounded by a plurality of strands of heavy twine. When a predetermined size of bale has been achieved, the twine-tying mechanism of the baler is triggered into action to tie said strands into loops around the formed bale.

The twine-tying mechanism of the baler comprises one individual knot-tying and clamping means for each strand of twine. Each of these knot-tying and clamping means comprise, inter alia, cooperating clamping members which secure the leading end of the strand of twine in operative position, an arcuate needle which forms an elongated loop of twine around the trailing end of the compressed bale which is to be tied, a knot-tying unit which operates to tie the leading end of each strand of twine to a portion of one side of said elongated loop of twine which is formed by said arcuate needle, and knife means which are associated with one of said clamping members to sever a completed and tied strand of twine from what will become the leading end of the next strand of twine as the same is fed from a conventional supply ball of said twine.

Conventionally, in one type of knotter the severing knife for the twine has been carried by one of said pair of cooperating clamping members of which one is stationary and the other is rotatable by means of a shaft extending axially of both of said members and rotatable within the stationary member. The rotatable clamping member also is provided with an arcuate twine guide hook which extends partially around the periphery of the movable clamping member and is twisted a limited amount in axial direction toward the stationary clamping member. The function of said guide hook is to become inserted in the elongated loop of twine formed by the arcuate needle referred to above whereby, as said needle retracts to its idle position, an elongated loop of twine is maintained in operative association with the knot-tying unit and the clamping means.

The entire knot-tying operation is completed by modern balers in less than one second of a minute. It will thus be seen that operation of all parts is exceedingly rapid and the cooperation between the various items and units must be precise. In order to sever the tied strand of twine from the elongated loop thereof referred to above, it is also conventional to attach a knife to the rotatable clamping member which also carries said arcuate twine guide hook. The strand of said elongated loop of twine which is to be severed is held under at least a limited amount of tension during the tying and severing operation. A typical example of a currently used knife of the type referred to is illustrated in U.S. Patent No. 2,981,174, dated Apr. 25, 1961.

It will be seen from FIG. 3 in particular and also from FIG. 4 of said patent that the knife 54 is offset in a radial direction a substantial distance from the axis of rotatable shaft 35 and the cutting edge is at the outermost end while only the opposite end of the knife is attached cantilever fashion to its rotatable support 39 by means of only a single bolt. Further, the portion of the knife 54 which contains the cutting edge is offset laterally outward a substantial distance from the attached end of the knife, whereby not only appreciable torque is required to effect operation of the knife but, in addition, continual use thereof tends to bend the cutting edge of the knife an even greater distance away from the axis of shaft 35, thereby additionally increasing the amount of torque required to effect severing of twine thereby.

For further reference to the general type of knot-tying and clamping mechanism to which the present invention pertains, attention is directed to Pats. Nos. 512,762 and 615,815.

Summary of the invention

The principal object of the present invention is to provide an improved twine-cutting or severing mechanism in association with twine-clamping means for a baler which employs twine to tie the bales in compressed condition. It has been found that by using a very simple, planar blade and supporting the same upon the end of the rotatable clamping member which is opposite that which has the clamping surface thereon and particularly by connecting said blade to supporting means on said rotatable clamping member which preferably is radially inward from the periphery of the arcuate twine guide hook which is also on said movable clamping member so as to provide a short lever arm, a superior type of severing of the twine is produced as compared with the functioning of twine-severing knives of the type referred to in the above cited patents.

It is another object of the invention to provide on said end of the rotatable clamping member to which the knife blade is attached supporting and bracing means preferably in the form of a shallow groove which effectively receives the adjacent longitudinal edge of said planar knife blade for substantially the entire length thereof, and also including a sturdy lug which extends axially from said end of the rotatable clamping member to which the end of the knife blade opposite that which has the cutting edge thereon is firmly secured.

It is a further object of the invention to position said knife blade with respect to the arcuate twine guide hook in such a position that as an elongated loop of twine is engaged by said hook and the hook is rotated about the axis of the shaft which supports the same, one side of said loop which is to become the leading end of the next strand of twine to be tied around a bale slidably moves along one surface of said hook, which is opposite that from which the sharpened edge of the knife blade extends outward and rearward, while the opposite side of said loop is quickly and effectively engaged by the sharp angular cutting edge of said knife blade to sever the same in order that the tied bale may be ejected from the baler while said aforementioned one side of said elongated loop becomes clamped by the clamping members and is in position to be extended around the next bale to be formed within the baler.

Details of the foregoing objects and of the invention, as well as other objects thereof, are set forth in the following specification and illustrated in the accompanying drawings comprising a part thereof.

Brief description of the drawings

FIG. 1 is a side elevation of a knotter unit for a baler of the type to which the present invention pertains, the same being mounted on a fragmentarily and vertically sectioned portion of the bale case of a baler.

FIG. 2 is a sectional view of the knotter mechanism shown in FIG. 1 as seen on the line 2—2 of said figure, looking in the direction of the arrows.

FIG. 3 is a side elevation of the rotatable clamping member shown in the preceding figures which carries the arcuate twine guide hook and the severing knife blade.

FIG. 4 is a perspective view, on a larger scale than in FIG. 1, showing the clamping member of the knotter mechanism and the shaft which supports the rotatable clamping member as well as the arcuate twine guide hook and blade carried thereby.

FIG. 5 is a top plan view of the mechanism shown in FIG. 4 as seen on the line 5—5 of said figure.

FIG. 6 is a transverse sectional view showing a portion of the bill hook of the knot-tying unit of the knotter mechanism shown in FIG. 1 and the clamping mechanism which carries the twine guide hook and severing blade in position to effect cutting of a strand of twine as the clamping mechanism is rotated in the direction of the arrow shown in said figure.

FIG. 7 is a bottom plan view of the mechanism shown in FIG. 5.

Description of the preferred embodiment

Referring to FIG. 1, a fragmentary portion of the top wall of a bale case 10 is shown which has an opening 12 therein through which the apertured end of an arcuate needle 13, shown in phantom, projects for purposes of advancing an elongated loop of twine to the knot-tying unit 14 and the knot-clamping unit 16. A bracket 18 is connected to the top of the case 10 for purposes of supporting an angularly extending arm 20 which is connected at its outer end to a knotter frame casting 22.

Extending transversely through the casting 22 and rotatably supported within a suitable bearing 24 therein is an externally splined shaft 26 which is surrounded by a bearing sleeve 28, the interior of which is splined complementarily to that of the exterior of shaft 26 and the exterior of said sleeve is cylindrical for rotation within the bearing 24. It will be understood that the casting 22 comprises at least part of an enclosure for certain operating mechanism of the knot-tying and knot-clamping units 14 and 16, details of which are described hereinafter.

A cam 30 having an arcuate relief portion 32 therein and a segmental ear section 34 thereon is clamped to the shaft 26 and sleeve 28 for rotation therewith. A pair of bearing bosses 36 and 38 are formed integrally with casting 22 and are provided with radially extending bearings which respectively receive shafts 40 and 42 which respectively operate the knot-clamping unit 16 and the knot-tying unit 14. Inasmuch as the present invention is not closely concerned with the knot-tying unit 14, no further description thereof is set forth. For further details thereof, attention is directed to aforementioned co-pending application Ser. No. 633,496, which pertains thereto.

Shaft 40 is rotatably mounted within the bearing opening of boss 36 and also is arranged for limited longitudinal movement therein. Said shaft also has a splined portion 44 which is received within an axial opening of bevel gear 46 that is splined in a complementary manner to the shaft. As the segmental gear section 34 is revolved by shaft 26, it will engage bevel gear 46 and effect a complete revolution thereof at a speed commensurate with the operation of the knot-tying unit 14 which is similarly rotated an instant previously by the same gear segment 34 as described in said co-pending application.

The knot-clamping unit 16 comprises a stationary clamping member 48 which abuts the outer face of bearing boss 36, as clearly shown in FIG. 2. Referring to FIG. 1, it will be seen that a locking pin 50 on clamping member 48 is received within a complementary opening in boss 36 to prevent rotation between member 48 and boss 36. Clamping member 48 also is provided with a central opening complementary to shaft 40 which revolves in said opening.

Cooperating with the stationary clamping member 48 is a movable, complementary clamping member 52 which, as viewed in FIG. 2, has an upper, conical clamping surface 54 which is complementary to the conical clamping surface 56 extending upwardly into stationary clamping member 48 from the lower end thereof. Clamping pressure between the surfaces 54 and 56 is maintained by a lever 58 which is supported adjacent one end by a pivot pin 60 provided in the outer end of lateral bracket 62 connected to arm 20. An auxiliary lever 64 is interconnected to lever 58 by shock absorbing means 66 and has a cam follower roller 68 on the outer end thereof which engages cam 30. The lower end 70 of lever 58 engages an antifriction member 72 mounted in the outer end of sleeve 74 on clamping member 52 which is fixed to shaft 40.

During the major portion of the rotation of cam 30, the clamping surfaces of the complementary clamping members 48 and 52 are maintained in clamping engagement with each other but when the follower roller 68 reaches the arcuate relief portion 32 of said cam, the pressure of twine between the clamping surfaces of the clamping members is sufficient to cause the rotatable clamping member 52 to move axially away a very limited distance from the stationary clamping member 48 so as to permit the clamped leading end of a strand of twine around a bale to be released therefrom after such strand has been tied by the knot-tying unit 14 and it is necessary to sever the portion of the continuous strand of twine leading to said knot from the tied strand and thereby present a new leading end of the twine which is clamped between said clamping members 48 and 52 in a manner similar to that described in said aforementioned patents.

The rotatable clamping member 52 also is formed with an arcuate and somewhat twisted twine guide hook 76, the outer end 78 of which is pointed and the opposite, base end of which is preferably formed integrally with clamping member 52, as readily can be seen from FIGS. 5–7. It also will be seen from these figures that the arcuate extent of the hook 76 is substantial and amounts to approximately 180° about the axis of shaft 40 and the radius of the axis of hook 76 preferably gradually increases with respect to the axis of shaft 40 as the terminal end 78 of hook 76 is approached.

In the operation of the knotter mechanism such as shown somewhat in overall manner in FIG. 1, the arcuate needle 13 extends through the opening 12 and is projected through the U-shaped guide 80 shown in FIGS. 1 and 2. The outer end of the needle is pointed and has an eye therein through which twine is threaded. Accordingly, as the curved needle advances toward the knot-clamping unit 16 and actually somewhat therebeyond, the timing of the engagement of segmental gear 34 with bevel gear 46 of the knot-clamping unit is such as to institute rotation of clamping member 52 and guide hook 76 thereon. When this occurs, the terminal end 78 of the guide hook is projected through the elongated loop of twine which is formed by the curved needle referred to above the rotation of the hook 76 brings both strands of said elongated loop into operative relationship with the clamping members 48 and 52.

The strands of twine which comprise the opposite sides of said elongated loop respectively extend from the upper and lower surfaces of the hook 76 and the lower strand, as viewed in FIGS. 1 and 2 particularly, is connected to a knot which has just been tied by the knot-tying unit 14 in accordance with the description contained in said co-pending application. After hook 76 has engaged the elongated loop of twine, the needle then may retract while retaining one side of said loop threaded therethrough, said side becoming the leading end of the new strand to be tied around the next bale to be formed after the knotted and tied strand on the last-formed bale has been severed from the supply strand of twine and incident to which operation the newly formed leading end of the next strand is clamped between the clamping members 48 and 52.

In accordance with the rapid sequence of operations of the knot-tying and knot-clamping units 14 and 16, the operation of the knot-tying unit 14 actually occurs an instant prior to the rotation of the clamping member 15 and the hook 76, whereby a knot has been formed by unit 14 when said rotation of member 52 and hook 76 takes place. Accordingly, it is then suitable to sever the strand of supply twine which extends from the tied knot and this is the strand which passes along the lower surface of hook 76 as referred to above, while the upper strand of twine moving along the hook 76 becomes the lead end of the new strand for the next bale to be formed.

The present invention primarily is concerned with the means for severing said twine, details of which will now be set forth. Referring to FIGS. 3–7, it will be seen that said severing means comprises a planar knife blade 82 which is formed from durable tool steel or the like. One end is provided with a sharpened cutting edge 84, best shown in FIGS. 3 and 7, which preferably extends at an acute angle to the horizontal as viewed in said figure. The opposite end is provided with an aperture to receive a clamping screw or bolt 86 which permits disconnection of the blade for sharpening. The clamping screw 86 is threaded into a supporting lug 88 which depends, preferably vertically, from the transverse face of the lower end of movable clamping member 52.

As best seen in FIG. 3, but also partially shown in FIG. 7, the lower face of movable clamping member 52 is provided with a positioning groove 90 which is of limited depth and is substantially competely coextensive in length with the upper edge of blade 82. Further, the groove 90 is complementary in width to the thickness of the blade 82 and such positioning of the outer tip end of sloping cutting edge 84 of the blade 82 within said groove, in which it is effectively secured by clamping screw 86, is adequate to resist any tendency for the cutting edge of the blade to be moved out of its fixed position with respect to clamping member 52 and guide hook 76 during the severing of a strand of twine by the cutting edge 84 while the clamping member 52 and hook 76 are rotated.

From the foregoing, it will be seen, therefore, that the very simple, planar blade 82 is effectively secured in operative position, with equally simple supporting means in a manner to resist any bending or distortion of the blade 82 while it is effecting a severing operation. In addition, from FIGS. 5–7 in particular, it will be seen that the blade 82 is within a plane parallel to the axis of shaft 40 and actually is mounted in the base portion of hook 76 where it is connected to the movable clamping member 52.

Still further, it will also be seen that the entire extent of the blade 82 is radially inward from the outer perimeter of hook 76, whereby the radial dimension between the axis of shaft 40 and the plane of blade 82 is very short. As a result of this, only a very limited amount of torque is required to effect the severing operation of blade 82. In addition, said severing occurs, as viewed in FIG. 6, while the hook 76 and clamping member 52 are moving in the direction of the arrow illustrated therein, at which time the strand 92 of twine is held in a taut condition between bill hook 94 of knot-tying unit 14 and the coacting clamping members 48 and 52. A single rotation of the member 52 and hook 76 is all that is necessary to effect such severing of the strand of twine 92.

While the invention has been described and illustrated in its preferred embodiment, it should be understood that the invention is not to be limited to the precise details herein illustrated and described since the same may be carried out in other ways falling within the scope of the invention as claimed.

What is claimed is:

1. Twine clamping means for a baler employing twine to tie bales and operable to cooperate with a twine knotter unit, said clamping means comprising a pair of cooperating clamping members and one of said members being stationary and the other being supported upon a rotatable shaft for rotation thereby, said rotatable member having a clamping surface on one end complementary to a clamping surface on said stationary member and also supporting an arcuate twine guide hook fixed at its base end to said member adjacent the opposite end of said member, in combination with a planar knife blade rigidly connected at one end to said rotatable clamping member within a plane generally parallel to the axis of said shaft and perpendicular to said opposite end of said rotatable clamping member, the other end of said blade having an angular cutting edge extending in an axial direction away from said guide hook and rearwardly therefrom relative to the direction of movement of said rotatable clamping member, whereby said knife is moved into engagement with said strand of said elongated loop which is to be cut and the other strand rides on the opposite side of said hook for clamping engagement between said clamping members.

2. The twine clamping means according to claim 1 in which said base end of said hook is provided with a groove receiving and positioning the edge of said knife blade from which the leading end of said angular cutting edge extends.

3. The twine clamping means according to claim 1 further including a supporting lug projecting in an axial direction outwardly from said opposite end of said movable clamping member and directly adjacent said root end of said guide hook, whereby minimum torque is required to operate said knife to effect cutting of said twine.

4. The twine clamping means according to claim 1 in which said knife blade is positioned radially inward from the periphery of said arcuate twine guide hook, thereby to provide a short lever arm relative to the axis of said shaft to minimize the torque required to effect cutting of twine by said blade.

5. The twine clamping means according to claim 1 in which said rotatable clamping member is provided with means on the face of said opposite end thereof to engage one edge of said knife blade for substantially the full length thereof and thereby prevent radial movement thereof resulting from stress imposed thereon by twine incident to being cut thereby.

References Cited
UNITED STATES PATENTS

| | | | |
|---|---|---|---|
| 1,155,860 | 10/1915 | Witte | 289—13 |
| 1,529,914 | 3/1925 | Prochazka | 289—13 |
| 2,716,035 | 8/1955 | Thorndike | 289—13 |

LOUIS K. RIMRODT, *Primary Examiner.*